United States Patent
Giro Amigo

(10) Patent No.: US 8,389,877 B2
(45) Date of Patent: Mar. 5, 2013

(54) CONVEYOR FOR WEIGHING SUSPENDED FLEXIBLE PACKS WITH A SUPPORT SURFACE POSITIONED TO MAKE CONTACT WITH THE PACK WHILE WEIGHING TO STABILIZE SWINGING MOVEMENT

(75) Inventor: Ezequiel Giro Amigo, Badalona (ES)

(73) Assignee: Girnet Internacional, S.L., Badalona (ES)

( * ) Notice: Subject to any disclaimer, the term of this patent is extended or adjusted under 35 U.S.C. 154(b) by 391 days.

(21) Appl. No.: 12/693,082

(22) Filed: Jan. 25, 2010

(65) Prior Publication Data

US 2010/0187021 A1 Jul. 29, 2010

(30) Foreign Application Priority Data

Jan. 29, 2009 (ES) .................................. 200900250

(51) Int. Cl.
*G01G 19/14* (2006.01)
*G01G 19/18* (2006.01)
*G01G 23/06* (2006.01)

(52) U.S. Cl. ........ 177/119; 177/125; 177/145; 177/160; 141/83; 53/502

(58) Field of Classification Search .............. 141/83; 53/502; 177/119, 145, 160, 125
See application file for complete search history.

(56) References Cited

U.S. PATENT DOCUMENTS

| | | | | |
|---|---|---|---|---|
| 598,440 | A * | 2/1898 | Raymond | 53/138.7 |
| 4,137,689 | A * | 2/1979 | McClusky et al. | 53/502 |
| 4,566,584 | A * | 1/1986 | Lindstrom | 177/145 |
| 4,928,473 | A * | 5/1990 | Nagao et al. | 53/53 |
| 5,115,619 | A | 5/1992 | Lieder | |
| 5,979,512 | A | 11/1999 | McGregor et al. | |
| 6,073,667 | A * | 6/2000 | Graffin | 141/372 |
| 6,084,184 | A * | 7/2000 | Troisi | 177/145 |
| 7,141,745 | B1 * | 11/2006 | Schoon et al. | 177/25.15 |
| 8,232,483 | B2 * | 7/2012 | Murdter | 177/160 |
| 2004/0238128 | A1 | 12/2004 | Giro Amigo | |
| 2012/0006599 | A1 * | 1/2012 | Murdter | 177/1 |

FOREIGN PATENT DOCUMENTS

| | | |
|---|---|---|
| DE | 10 2007 014 890 A1 | 10/2008 |
| EP | 1 481 899 A1 | 12/2004 |
| ES | 2 212 693 A1 | 7/2004 |

OTHER PUBLICATIONS

European Search Report for EP 09 38 2299, dated May 18, 2010.

\* cited by examiner

Primary Examiner — Randy W Gibson
(74) Attorney, Agent, or Firm — Sughrue Mion, PLLC

(57) ABSTRACT

A process for weighing successive flexible filled packs, without conveyance of the packs being stopped and without the conveyance suddenly decelerating, to weighing device which holds and transports the packs in suspension to a delivery position; the weighing process including measuring by a scale the weight of the assembly formed by the weighing device and the weight of the conveyed pack or packs, the average speed of the conveyance of the packs and/or the length of the conveyed distance being selected such that during a predetermined time period a single pack is held and conveyed in suspension by the weighing device. The weighing device for the packs includes first and second endless belts between which holding portions of the packs to be weighed are introduced, and the suspended packs are conveyed by the movement of the endless belts.

12 Claims, 3 Drawing Sheets

CONVEYOR FOR WEIGHING SUSPENDED FLEXIBLE PACKS WITH A SUPPORT SURFACE POSITIONED TO MAKE CONTACT WITH THE PACK WHILE WEIGHING TO STABILIZE SWINGING MOVEMENT

TECHNICAL FIELD OF THE INVENTION

The invention relates to a process for the weighing of successive filled packs delivered successively by an automatic machine for manufacturing and filling packs; to a device for putting the process into practice, particularly suitable for flexible filled packs, provided with a planar end portion; and to an installation comprising a device according to the invention.

BACKGROUND OF THE INVENTION

Automatic machine for manufacturing and filling packs, such as machines for manufacturing mesh bags containing horticultural products, in which the packing operations are carried out automatically and in which successive filled packs are conveyed, suspended from conveyor means, from a last station in which the pack is handled for its closure to a delivery ramp, on which the held packs are released by said conveyor means, are known today. In the example described in patent EP1481899, the conveyor means consist of a pair of arms describing an alternating movement, which close to hold the successive filled packs in the closing station and which move towards the ramp until reaching the end of their path, in which they open to release the pack before moving in the opposite direction until reaching the closing station to hold another filled pack, and so on and so forth.

A drawback of packaging in automatic machines such as the one described in patent document EP1481899, which has a high cyclic rate, is the control of the weighing of the filled and closed bags.

Preferably, the weighing must be done with the pack suspended, so the weighing of the filled packs deposited on conveyor belts or the like provided with weight sensors, and especially when the packs are formed by flexible bags containing horticultural products, such as tubers and citrus fruits, it is not altogether satisfactory due to the little stability of the bags and of their content, even more when the conveyor belt is in motion, being able to cause a redistribution of the products in the pack which can alter the measurement of the weight.

If one wants to avoid altering or modifying the existing machines, the weighing of suspended packs means that the filled packs must be transferred from the conveyor means of the machine to a weighing device. The measurement of the weight of the filled packs on static weighing means involves a deceleration of the forward movement of the packs, which generates unwanted inertias that can alter the measurement, and a reduction of the production volume due to the stabilization time required by the weight measurement means when the load to be measured is varied significantly.

The patent document ES 2212693 describes a solution that can be applied to automatic machines, comprising first and second filled pack conveyor means, both provided with several pairs of conveyor arms separated by a predetermined distance, the pairs of conveyor arms being assembled in guides describing a straight path and a closed path, respectively, which move at the same speed and such that the packs can be transferred without stopping from the pairs of arms of the first conveyor means to the pairs of arms of the second conveyor means. The guide of the second conveyor means is provided with a straight weighing section in which weighing means are arranged.

This solution has certain drawbacks, among which its high cost due to incorporating a high number of pairs of arms, the complexity in operating the pairs of arms when transferring the packs from some pairs of arms to others, and the scarce length of the weighing section required for the individual measurement of the filled packs, which cannot be greater than the distance which separates two consecutive pairs of arms, standing out among them. In addition to the aforementioned drawbacks, it should be added that it is a solution that cannot be easily applied to a machine such as the one described in patent document EP1481899, and which leads to an installation that is not at all compact and occupies a lot of space.

An object of the present invention is to describe a process for the weighing of the filled packs which solves the aforementioned drawbacks, as well as a device for putting the process into practice, which device is furthermore more compact, cost-effective and versatile than the devices known to date.

DISCLOSURE OF THE INVENTION

The process for the weighing of successive filled packs, individually conveyed in suspension by conveyor means of an automatic machine for manufacturing and filling packs, is essentially characterized in that the conveyed packs are sequentially transferred, without their conveyance being stopped and without them suddenly decelerating, from the conveyor means of the machine to the holding means of a weighing device which holds them and conveys them in suspension towards a delivery position, in which the packs are released, the process comprising the operation of measuring by means of a scale the weight of the assembly formed by the holding means of the weighing device and that of the conveyed pack or packs, the average speed of the conveyance of the packs and/or the length of the conveyed distance being selected such that at least during a predetermined time period, a single pack is being held and conveyed in suspension by the mentioned holding means, during which time period the scale is stabilized before recording the weight of the pack.

The process is particularly suitable for the weighing of packs conveyed by an automatic machine and according to a set cyclic rate, which is not to be altered. The average speed of the holding means of the weighing device or the length of the path transited by said holding means, or both parameters, must be adjusted according to the cyclic rate of the automatic machine for manufacturing and filling packs to assure that a single pack will be held and conveyed during a predetermined time period. Naturally, the duration of said time period must be adapted, basically depending on the quality of the scale used (i.e., on the stabilization time required for weights close to the nominal weight of the packs) or on the precision required for the measurement of the weight of the packs.

According to one embodiment, the time elapsing from when a pack is released by the holding means of the weighing device until a new pack is transferred to said holding means, or the other way around, is less than the time necessary for the scale to record a decrease or an increase of weight, respectively, equivalent to the nominal weight of the packs.

This variant of the process allows even further reducing the stabilization time of the scale as significant measurement oscillations are prevented.

According to another feature of the invention, the mentioned holding means for the packs comprise first and second endless belts simultaneously moving forward and describing respective coplanar paths, demarcating between one another and along respective forward movement sections a space in which planar end portions of the successive packs to be weighed are introduced, which portions are seized by the two endless belts, the suspended packs being conveyed by the movement of the endless belts along the mentioned forward movement sections of said endless belts.

Preferably, the mentioned forward movement sections of the endless belts are straight.

According to a variant of the process, the measurement of the weight of the mentioned holding means together with that of the suspended pack is done continuously, while the latter is suspended from the holding means and without stopping the forward movement of the endless belts and therefore the conveyance of the suspended pack.

According to another variant of the process, the forward movement of the endless belts is intermittent, the conveyance of the suspended pack being interrupted at an intermediate point along the forward movement sections of the endless belts, and it comprises the operation of recording the value of the weight measured when the forward movement of the belts is interrupted.

According to another feature of the process, the holding means are provided with support means for the conveyed packs on which the packs slide during their conveyance by the endless belts, suitable for preventing the swinging of said packs while they remain suspended from the mentioned endless belts.

A device for putting the process into practice according to the claim, particularly suitable for flexible packs provided with a planar end portion, comprises in a known manner holding means for the packs to be weighed and weighing means.

The claimed device is essentially characterized in that the mentioned holding means for the packs comprise first and second endless belts simultaneously moving forward and describing respective coplanar paths, demarcating between one another and along respective forward movement sections a space suitable for receiving the insertion of the planar end portions of the successive packs to be weighed, which portions are seized between the two belts, the suspended packs being conveyed by the movement of the endless belts along the mentioned forward movement sections of said endless belts, the weighing means comprising a weight sensor suitable for measuring the assembly formed by the holding means for the packs and the temporarily suspended pack or packs.

According to another feature of the device, the holding means for the packs are provided with support means for the packs on which the packs slide during their conveyance by the endless belts, intended for preventing the swinging of said packs while they remain suspended from the mentioned endless belts.

In a preferred embodiment, the distance between the support means and the holding means for the packs is adjustable.

According to another feature, the holding means for the packs comprise a pair of horizontally arranged and coplanar plates suspended from a support structure, provided with respective opposite and parallel side edges defining a passage for guiding the packs during their conveyance by the endless belts and on which the respective support rollers of the endless belts, distributed throughout their respective forward movement sections, are assembled.

In an embodiment variant, at the receiving end of the packs, the plates are provided on their opposite edges with respective chamfers defining between one another a V-shaped recess, intended for guiding and facilitating the introduction of the planar end portion of the packs to be weighed in the space demarcated by the forward movement sections of the endless belts.

BRIEF DESCRIPTION OF THE DRAWINGS

The attached drawings illustrate, by way of non-limiting example, a device and an installation according to the invention. Specifically.

DETAILED DESCRIPTION OF THE DRAWINGS

Figure 1:
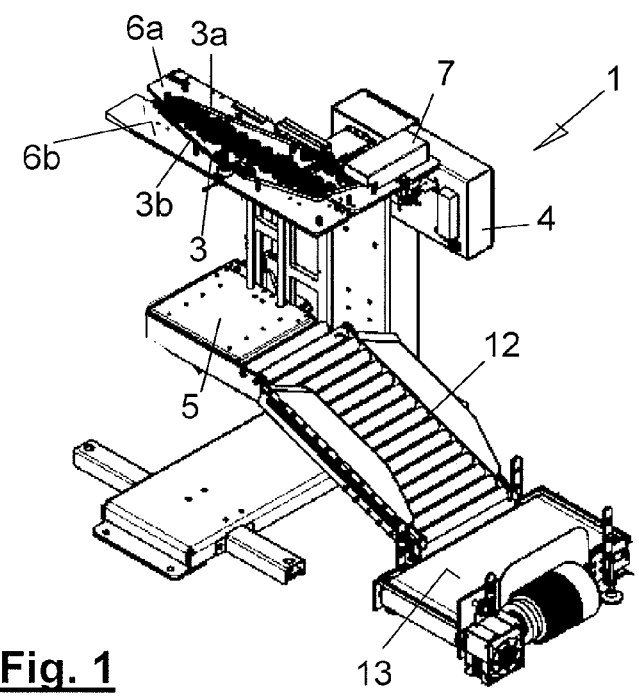
FIG. 1 is a perspective view of a device according to the invention.

The device depicted in FIG. 1 comprises suspended holding means 3 for filled packs and weighing means 4 suitable for measuring the weight of the assembly formed by said holding means 3 and that of the held pack or packs.

The holding means 3 for the packs are suitable for holding the packs that are transferred to them from an automatic machine for manufacturing and filling packs without interrupting their movement and without the conveyance speed being initially altered, unwanted inertias in the packs being prevented.

Figure 2:
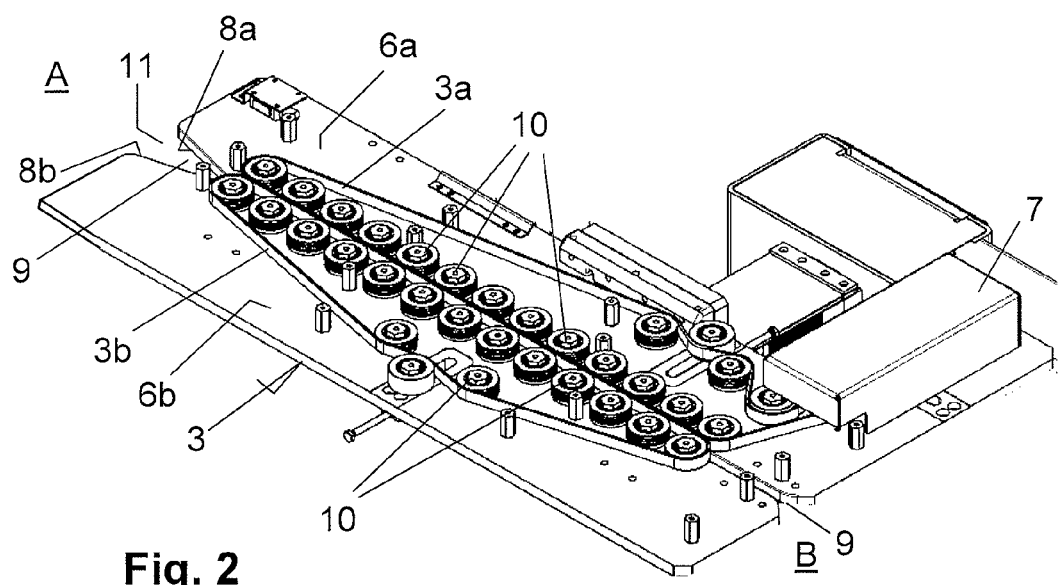
FIG. 2 is an enlarged view of the holding means for the packs of the device according to FIG. 1, FIGS. 3 and 4 are respective side views of the device according to FIG. 1, illustrating a sequence of the process according to the invention for the weighing of mash bag-type packs.

For this purpose, as can be seen in FIG. 2, the holding means 3 for the packs comprise first and second endless belts 3a and 3b describing respective coplanar paths and simultaneously moving forward, demarcating between one another and along respective forward movement sections a space suitable for receiving the insertion of respective holding portions of the successive packs to be weighed. The mentioned holding portions of the packs which are introduced between the endless belts 3a and 3b by the receiving end A of the previously described space are quickly seized under pressure by said belts 3a and 3b in motion and the corresponding packs are conveyed in suspension at the same forward movement speed as that of the endless belts 3a and 3b, the latter along the mentioned forward movement sections, to their release or delivery end B. It can be seen in FIG. 2 that the holding means 3 for the packs comprise a pair of horizontally arranged and coplanar plates 6a and 6b suspended from a support structure 7, provided with respective opposite and parallel side edges 8a and 8b defining a passage 9 for guiding the holding portions of the packs during their conveyance by the endless belts 3a and 3b from the receiving end A to the delivery end B. Assembled on these plates 6a and 6b are the respective return, deflection and support rollers 10 of the endless belts 3a, 3b, the support rollers being distributed along the forward movement sections of said endless belts 3a and 3b.

In the example of FIG. 2, one of the endless belts is driven directly by a motor driven roller, whereas the complementary belt is passive and moves forward driven by the endless belt driven by the motor.

It can also be seen in FIG. 2 that in the receiving end A of the packs, the plates 6a and 6b are provided on their opposite edges with respective chamfers defining between one another a V-shaped recess 11, intended for guiding and facilitating the introduction of the holding portion of the packs to be weighed in the passage 9 and in the space demarcated by the forward movement sections of the endless belts 3a and 3b.

The variant of the device 1 depicted is especially suitable for holding and conveying flexible packs, such as mesh bags of the type provided with a planar end portion which is used as a holding portion. For this application, the endless belts 3a and 3b along the respective forward movement sections are very close to one another during the conveyance of the packs.

The device of FIG. 1 is especially configured for being operated such that the holding means for the packs support during the longest possible time period the approximate weight of a single pack, for which purpose the transfer of new packs to be weighed to device 1 must be coordinated with the moment in which the conveyed pack reaches the end of its run along the forward movement section of the endless belts 3a and 3b, as will be explained in detail below.

According to this operating mode, the weight of the conveyed pack is obtained by subtracting the weight of the holding means 3 for the packs from the value recorded by the weighing means 4.

Putting the process according to the invention into practice by means of the device 1 is as follows:

In a first operative phase, a pack to be weighed is transferred to the holding means 3 for packs of the device 1, the pack being immediately held and, without stopping its movement, conveyed towards the delivery end B along the passage 9 demarcated by the plates 6a and 6b. It must be noted that to prevent unwanted deceleration in the movement of the packs, the forward movement speed of the endless belts 3a and 3b must be equal or close to the forward movement speed of the pack during its conveyance towards the device 1.

Figure 3:
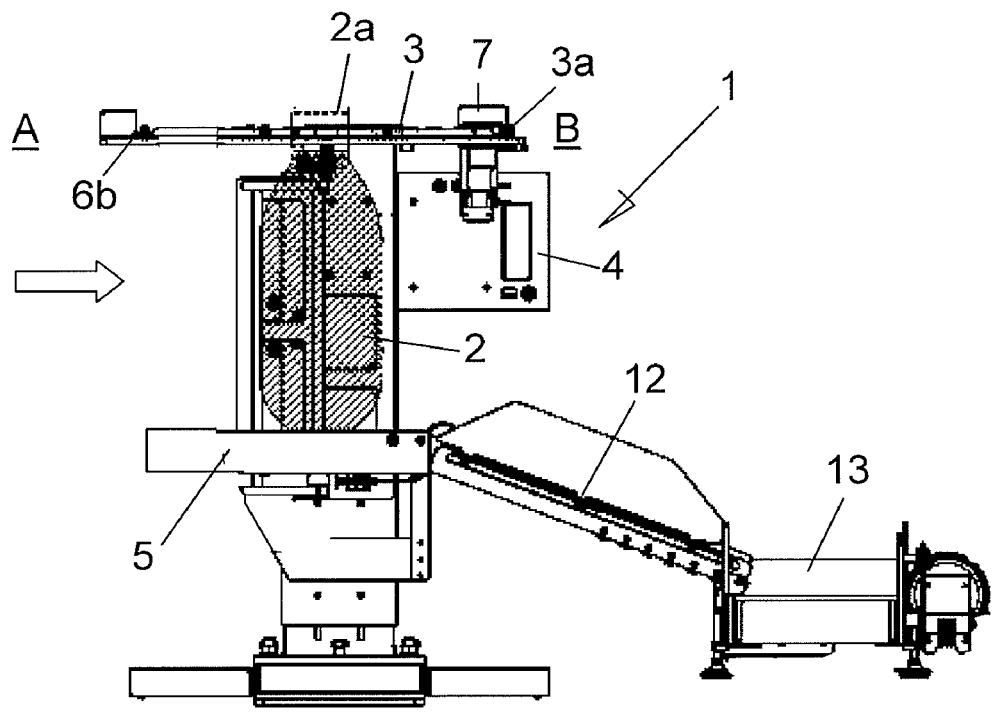

In a second operative phase (illustrated in FIG. 3), the pack 2 held by its planar end portion 2a is conveyed at a constant speed along the entire forward movement section of the endless belts 3a and 3b, the weight of the assembly formed by the holding means 3 for the packs and that of the conveyed pack 2 being measured continuously, the instantaneous weight corresponding to the moment in which the weighing means have stabilized being recorded.

Figure 4:
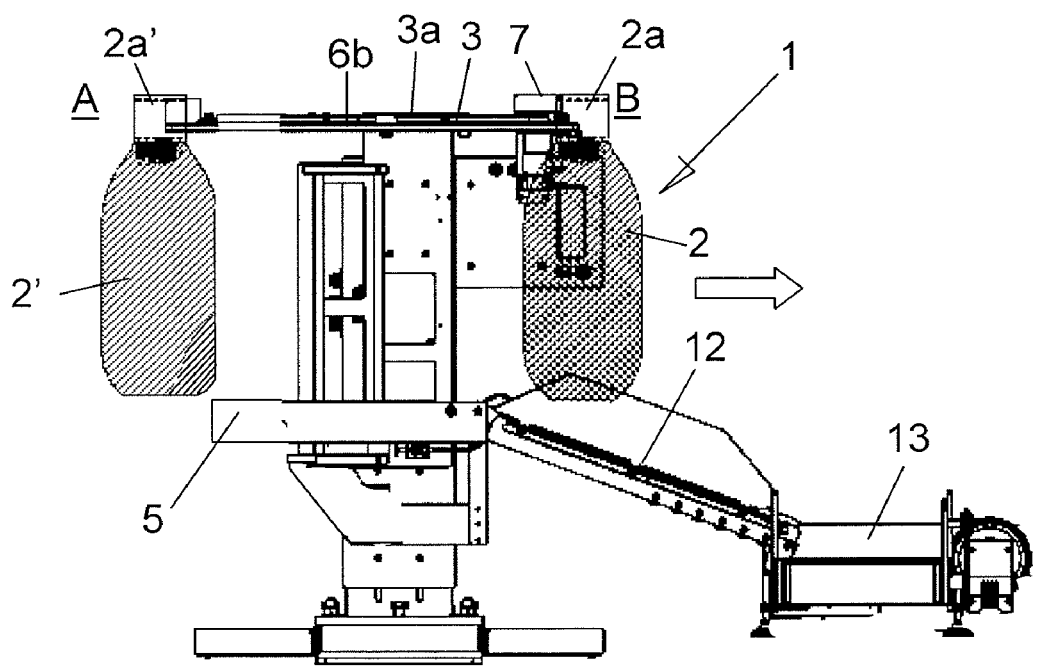

In a third operative phase (illustrated in FIG. 4), the pack 2 reaches the delivery end B and is automatically released from the endless belts 3a and 3b when its planar end portion 2a comes out of said endless belts 3a and 3b, which at this point are deflected, their paths diverging; and, simultaneously a new pack 2' is transferred to device 1, being introduced in the space defined by the endless belts 3a and 3b. In the context of the patent, "simultaneously" means that the time elapsing from when the pack 2 is released until the new pack 2' is transferred to the holding means 3 of the weighing device 1, or the other way around, is less than the time necessary for the scale to record a weight decrease or increase, respectively, equivalent to the nominal weight of the packs. In other words, the holding means 3 for the packs should not be load-free nor should they bear the weight of two filled packs during a time period that is long enough for the weighing means to record weight decrease or increase, albeit instantaneous, that is great enough to delay stabilization time. Prolonging the stabilization time of the weighing means 4 means that the holding time of the packs must be prolonged, for example by reducing the forward movement speed of the endless belts 3a and 3b, which means reducing the weighing cyclic rate. If the cyclic rate is less than that of the automatic machine providing the filled packs, the speed of the latter must be reduced to obtain adjusted weight measurements, which would cause an unwanted reduction of the output of the installation.

The second operative step could alternatively be implemented in a discontinuous manner. According to this variant of the process, the measurement of the weight of the mentioned holding means 3 for the packs together with that of the suspended pack is not done continuously, while the pack is suspended from the holding means 3 and without stopping the forward movement of the endless belts 3a and 3b, and therefore the conveyance of the suspended pack, but rather the forward movement of the endless belts 3a and 3b is intermittent, the conveyance of the suspended pack being interrupted at an intermediate point along the forward movement sections of the endless belts 3a and 3b. This variant of the second operative phase comprises the operation of recording the value of the weight measured when the forward movement of the belts 3a and 3b is interrupted, the weighing means 4 having already been stabilized during the time elapsing from when the pack was transferred until it reaches the intermediate point for recording the weight.

The variant of the process furthermore allows applying on the pack 2, and especially on its planar end portion 2a, a printed label with the exact weight of the pack 2 when the forward movement of the endless belts 3a and 3b is interrupted, the pack 2 being held still by the holding means 3.

For the purpose of preventing the swinging of the packs 2 while they are held in suspension by the endless belts 3a and 3b, the holding means 3 for the packs 2 are provided with support means 5 for the packs 2 on which the packs 2 slide during their conveyance by the endless belts 3a and 3b, intended for preventing the swinging of said packs 2 while they remain suspended and especially when the forward movement of the endless belts 3a and 3b is stopped according to the alternative variant of the process described above.

Preferably, the distance between the support means 5 and the holding means 3 for the packs 2 is adjustable, being able to be adjusted according to the height of the packs 2 the weight of which must be measured.

Figure 5:
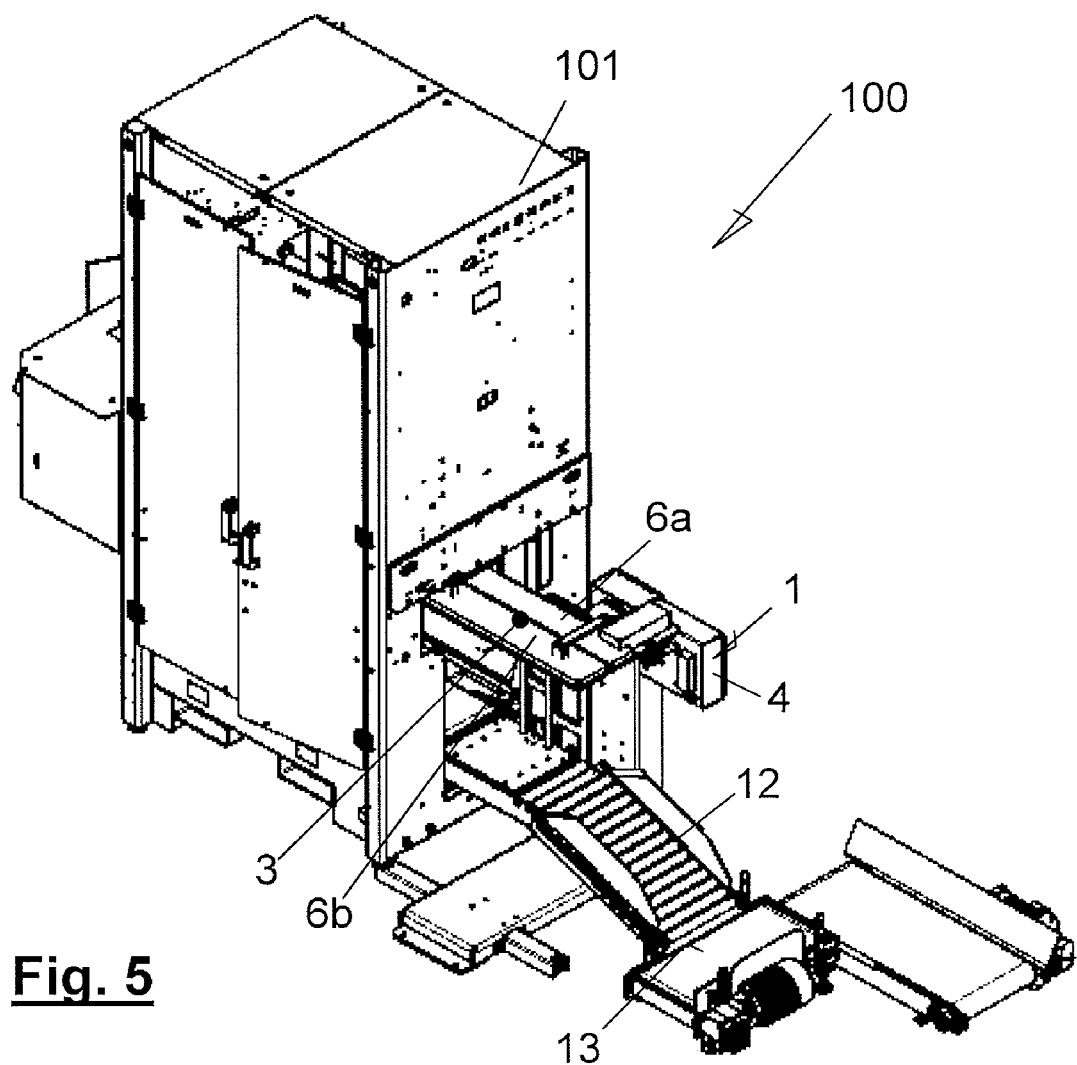
FIG. 5 is a perspective view of the assembly formed by an automatic machine for manufacturing and filling packs and a device according to FIG. 1.

The installation 100 for the weighing of successive filled packs, depicted in FIG. 5, comprises an automatic machine 101 for manufacturing and filling packs and a weighing device 1 according to FIG. 1, placed adjacent to the machine 101 but supported by a frame anchored to the ground that is independent and separate from the frame of the machine 101 to prevent the vibrations of the latter from affecting the precision of the weight measurements taken by the device 1. According to this installation, it is necessary for the path of the filled packs conveyed by the conveyor means of the machine 101 to reach the space demarcated by the forward movement sections of the endless belts 3a and 3b of the weighing device 1, so that the packs are automatically seized.

The automatic weight measurement allows distinguishing filled packs the weight of which is outside a predetermined weight range. As is observed in FIGS. 1, 3, 4 and 5, the device 1 depicted is provided with a discharge ramp 12 for the packs which are released by the holding means 3, when said packs reach the delivery end B of the forward movement section of the endless belts 3a and 3b. The discharge ramp 12 leads to a conveyor belt 13 that can be driven in both directions according to the order given by the weighing means 4 of the device 1. The conveyor belt 13 is driven in a first direction when the weight of the pack is acceptable, whereas it is driven in the opposite direction when the weight of the pack is not considered acceptable.

The invention claimed is:

1. A device (1) for weighing successive filled flexible packs provided with a planar end portion (2a), the device comprising:
   a holding means (3) for the flexible packs to be weighed; and
   a weighing means (4),
   wherein the holding means (3) for the flexible packs (2) comprises:
   first and second endless belts (3a, 3b) simultaneously moving forward and describing respective coplanar paths, demarcating between the respective coplanar paths and forward movement sections a space configured to receive insertion of the planar end portions of the successive packs to be weighed,
   wherein the planar end portions are seized and suspended between the two endless belts (3a, 3b), the flexible packs being conveyed by the movement of the endless belts (3a, 3b) along the forward movement sections of said endless belts (3a, 3b),
   the weighing means comprising (4) a weight sensor configured to measure weight of an assembly formed by the holding means (3) for the flexible packs, and
   wherein the holding means is provided with a support means for the conveyed flexible packs, on which the flexible packs slide during the conveyance by endless belts in the weighing device, thereby preventing swinging of said flexible packs while the flexible packs remain suspended from the endless belts.

2. The device (1) according to claim 1, wherein the distance between the support means (5) and the holding means (3) for the packs (2) is adjustable.

3. The device (1) according to claim 1, wherein the holding means (3) for the packs (2) comprise a pair of horizontally arranged and coplanar plates (6a, 6b) suspended from a support structure (7), provided with respective opposite and parallel side edges (8a, 8b) defining a passage (9) for guiding the packs (2) during their conveyance by the endless belts (3a, 3b), and on which there are assembled the respective support rollers (10) of the endless belts (3a, 3b), distributed along their respective forward movement sections.

4. The device (1) according to the claim 3, wherein in a receiving end (A) of the packs (2), each of the coplanar plates (6a, 6b) is provided with a chamfer defining between the coplanar plates a V-shaped recess (11), for guiding and facilitating an introduction of the planar end portion (2a) of the packs (2) to be weighed in the space (4) demarcated by the forward movement sections of the endless belts (3a, 3b).

5. An installation (100) for the weighing of successive filled packs (2), individually conveyed in suspension by conveyor means of an automatic machine (101) for manufacturing and filling packs (2), comprising: a weighing device (1) according to claim 1, supported by a frame anchored to the ground and separate from the frame of the machine (101), the mentioned weighing device (1) being placed adjacent to the machine (101) and such that the path of the packs (2) conveyed by the conveyor means reaches the space demarcated by the forward movement sections of the endless belts (3a, 3b) of the weighing device (1).

6. A process for automatically weighing successive filled flexible packs, the process comprising:
   providing a weighing device that comprises a conveyor mechanism;
   delivering a flexible pack to conveyor mechanism;
   supporting the flexible pack in suspension from the conveyor mechanism and conveying the flexible pack while in suspension by the conveyor mechanism;
   wherein the flexible pack is supported in suspension from the conveyor mechanism by an upper portion of the flexible pack;
   stabilizing swinging movement of the flexible pack by having the flexible pack contact a support surface in the weighing device;
   measuring a weight of the conveyor mechanism and the flexible pack; and
   releasing the flexible pack.

7. The process according to claim 6, wherein the flexible pack is suspended from a top end of the flexible pack.

8. The process according to claim 6, wherein the flexible pack slides on the support surface in the weighing device to stabilize the swinging movement of the flexible pack.

9. The process according to claim 6, wherein a bottom end of the flexible pack contacts the support surface.

10. The process according to claim 6, wherein the flexible pack is provided to the weighing device by an upstream conveyor unit that is separate from the conveyor mechanism of the weighing device.

11. A weighing device for weighing successive filled flexible packs provided with a planar end portion, the device comprising:
    a conveyor mechanism configured to support the flexible pack in suspension by an upper portion of the flexible pack and to convey the flexible pack while in suspension;
    a support surface positioned to make contact with the flexible pack so as to stabilize swinging movement of the flexible pack;
    a measuring unit configured to measure a weight of the conveyor mechanism and the flexible pack.

12. The device of claim 11, further comprising the flexible pack in suspension from the conveyor mechanism by a top end of the flexible pack and in contact with the support surface.

* * * * *